United States Patent [19]

Yoshimoto et al.

[11] 4,371,260

[45] Feb. 1, 1983

[54] METHOD FOR SETTING UP HIGHLIGHT AND SHADOW POINT DENSITY VALUES OF ORIGINAL PICTURES TO A PICTURE REPRODUCING MACHINE

[75] Inventors: Takeshi Yoshimoto; Hideki Hiraoka; Seiji Okazaki, all of Kyoto; Yoshihiro Taniguchi, Otsu; Tsutomu Harada, Ashiya, all of Japan

[73] Assignee: Dainippon Screen Seizo Kabushiki Kaisha, Kyoto, Japan

[21] Appl. No.: 240,969

[22] Filed: Mar. 5, 1981

[30] Foreign Application Priority Data

Mar. 13, 1980 [JP] Japan .................................. 55-30845

[51] Int. Cl.³ ............................................. G03B 27/80
[52] U.S. Cl. ........................................ 355/77; 355/68
[58] Field of Search .............................. 355/38, 68, 77

[56] References Cited

U.S. PATENT DOCUMENTS

| | | | |
|---|---|---|---|
| 4,206,998 | 6/1980 | Tokuda | 355/77 |
| 4,279,502 | 7/1981 | Thurm et al. | 355/77 X |
| 4,286,868 | 9/1981 | Laska | 355/77 X |

*Primary Examiner*—Michael L. Gellner
*Attorney, Agent, or Firm*—Daniel M. Rosen

[57] ABSTRACT

A method for setting up density values of highlight and shadow points of original pictures to a picture reproducing machine such as a color scanner and a color facsimile, wherein one of the original pictures now being scanned is discriminated to output a discrimination signal, and wherein the highlight and the shadow point density values or values corresponding to a density range of the one original picture are read out of a memory in which the highlight and the shadow point density values or the values corresponding to the density ranges of the original pictures are stored, by addressing the memory by means of the discrimination signal, and then are set up to the picture reproducing machine.

3 Claims, 10 Drawing Figures

METHOD FOR SETTING UP HIGHLIGHT AND SHADOW POINT DENSITY VALUES OF ORIGINAL PICTURES TO A PICTURE REPRODUCING MACHINE

BACKGROUND OF THE INVENTION

This invention relates to a method for setting density values of highlight and shadow points of original pictures in a picture reproducing machine such as a color scanner and a color facsimile system.

When color separation printing plates or films are prepared from an original picture by using a picture reproducing machine such as a color scanner, since the density range of the original picture is usually different from the reproducible density range of the picture reproducing machine, proper highlight and shadow points are selected in the original picture, and then their densities are set in the picture reproducing machine, thereby adjusting the density range of the original picture to the reproducible density range of the picture reproducing machine.

Such a setup of the density values of the highlight and the shadow points have been carried out in several ways. For example, the density values of the highlight and the shadow points of the original picture are detected by a densitometer. Then, a sensitivity of a photomultiplier tube is controlled in order to adjust the density value of the highlight point to a standard highlight density predetermined, and the density value of the shadow point is set up by adjusting a variable resistor of a density range setup circuit for setting up the density range of the original picture. Alternatively, as shown in FIG. 1, the density values of the highlight and the shadow points are set up in a density range setup circuit having a plurality of resistors selected by using rotary switches $S_1$ and $S_2$ connected thereto.

However, in the former method, the reproducibility of the highlight and the shadow points is not very good when the density values are detected, and a plurality of original pictures having different highlight and shadow point density values cannot be processed in a single operation. In the latter method, the improvement of accuracy of the setup or the extension of the setup range requires an excessive number of switches, and, when the switches are to be switched over at a high speed, viz., a plurality of original pictures having different highlight and shadow point density values are to be scanned, it is difficult to apply this method to the picture reproducing machine.

SUMMARY OF THE INVENTION

It is an object of the present invention to provide a method for setting density values of highlight and shadow points of original pictures in a picture reproducing machine such as a color scanner and a color facsimile free from the aforementioned defects, which is stable and reliable, and which is capable of processing automatically a plurality of original pictures having different highlight and shadow point density values at a high speed.

According to the present invention, a method for setting density values of highlight and shadow points of original pictures in a picture reproducing machine comprises the steps of (a) discriminating one of the original pictures while it is being scanned, to output a discrimination signal, (b) reading highlight and shadow point density values or values corresponding to a density range of the one original picture from a memory in which the highlight and the shadow point density values or the values corresponding to the density ranges of the original pictures are stored, by addressing the memory by means of the discrimination signal, and (c) setting the values read from the memory in the picture reproducing machine.

BRIEF DESCRIPTION OF DRAWINGS

In order that the present invention may be better understood, preferred embodiments thereof will now be described with reference to the accompanying drawings, in which.

DESCRIPTION OF PREFERRED EMBODIMENTS

Figure 1:
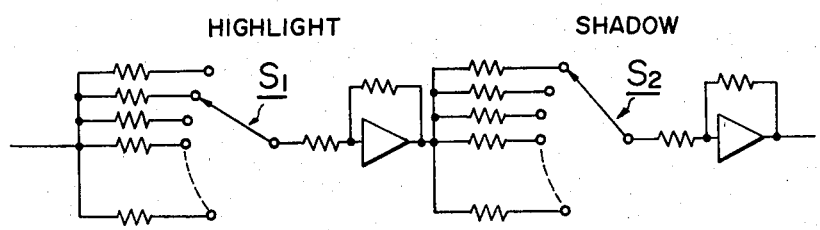
FIG. 1 is a schematic circuit diagram of a conventional density range setup circuit.
Figure 2:
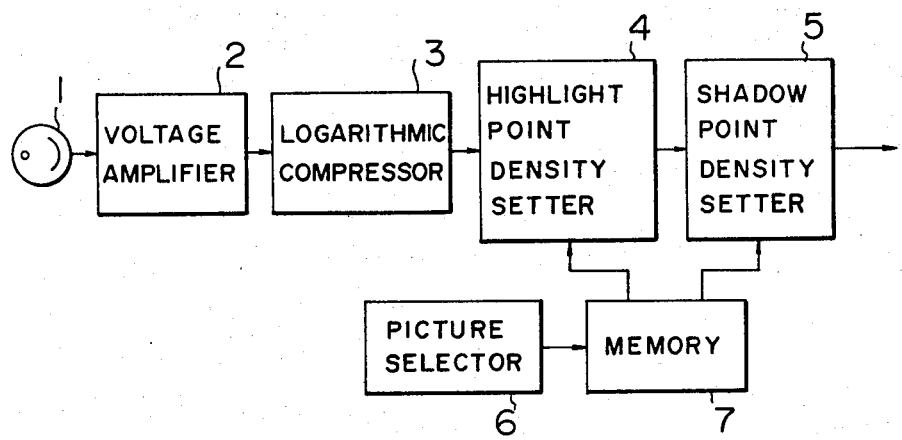
FIG. 2 is a block diagram of one embodiment of means for performing a method according to the present invention.

Referring now to the drawings there is shown in FIG. 2 one embodiment of means for performing a method according to the present invention which may be an essential part of a picture reproducing machine such as a color scanner, comprising a photomultiplier 1, a voltage amplifier 2, a logarithmic compressor 3, a highlight point density setter 4, a shadow point density setter 5, a picture selector 6 and a memory 7 in which highlight and shadow point density values or values corresponding to a density ranges of original pictures are stored together with their addresses.

Figure 3:
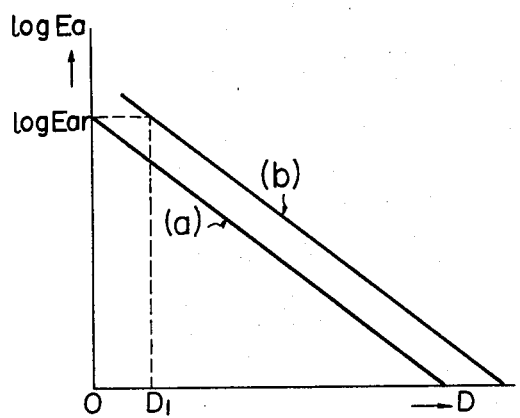
FIG. 3 is a graph showing a highlight setup condition according to the present invention.

Now, assuming that the output voltage of the voltage amplifier 2, which is obtained by picking up a standard highlight point density value determined considering the reproducible density range of the picture reproducing machine, is the output voltage Ear of the voltage amplifier 2, which is obtained by picking up a blank part from the original pictures mounted on a picture cylinder of the picture reproducing machine, the output voltage Ea of the voltage amplifier 2, which is obtained by picking up an original picture having a density value D, is expressed in the following equation I wherein R is a fixed number, as shown by a line (a) of FIG. 3.

$$\log Ea = -R \cdot D + \log Ear \tag{I}$$

At this time, a voltage Eb output from the logarithmic compressor 3 is obtained by the following equation II wherein $\alpha$ and $\beta$ are fixed numbers.

$$Eb = \alpha \log Ea + \beta \tag{II}$$

From the equations I and II, the following equation III is obtained.

$$Eb = \alpha(-R \cdot D + \log Ear) + \beta \tag{III}$$

On the other hand, supposing the setup of the highlight point density value is performed by adjusting the sensitivity of the photomultiplier 1 in a conventional manner with the result of a highlight point density value $D_1$, the output voltage Ea of the voltage amplifier 2 is obtained by the following equation IV, as shown by a line (b) of FIG. 3.

$$\log Ea = -R \cdot D + D_1 + \log Ear \tag{IV}$$

Now, an output voltage Eb' of the logarithmic compressor 3 is obtained by the following equation V.

$$Eb' = \alpha(-R \cdot D + D_1 + \log Ear) + \beta \tag{V}$$
$$\alpha(-R \cdot D + \log Ear) + \beta + \alpha D_1$$

From this equation, it is readily understood that the highlight point density setter 4 is so constructed as to shift the output voltage of the logarithmic compressor 3 by $\alpha D_1$ when the highlight point density value to be set up is $D_1$.

Figure 4:
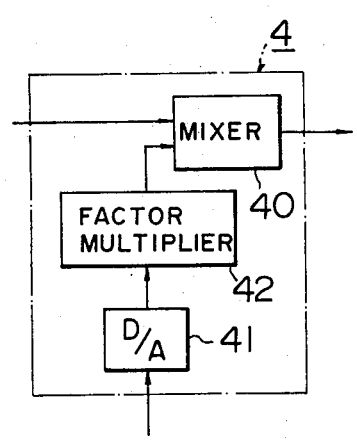
FIG. 4 is a block diagram of one embodiment of a highlight point density value setter of FIG. 2.

In FIG. 4 there is shown one embodiment of a highlight point density setter 4 of FIG. 2, comprising a mixer or an adder 40, a digital-analog converter 41, hereinafter referred to as a D/A converter, which converts the digital signal read from the memory 7 into the analog signal, and a factor multiplier 42 positioned therebetween.

Hence, the highlight point density value $D_1$ of the original picture to be processed, which is read out of the memory 7, is converted into an analog signal in the D/A converter 41, and the analog signal converted is multiplied by the factor $\alpha$ which is determined depending on the characteristics of the logarithmic compressor 3, in the factor multiplier 42. Thus the obtained density signal $\alpha D_1$ is sent to the mixer 40 and is added there to the voltage Eb output from the logarithmic compressor 3. Then, the highlight point density setter 4 outputs a voltage E shown by the following equation which is the same as the equation V.

$$E = \alpha(-R \cdot D + \log Ear) + \beta + \beta D_1 \tag{VI}$$

This constitutes the completion of the setup of the highlight point density value $D_1$.

Figure 5:
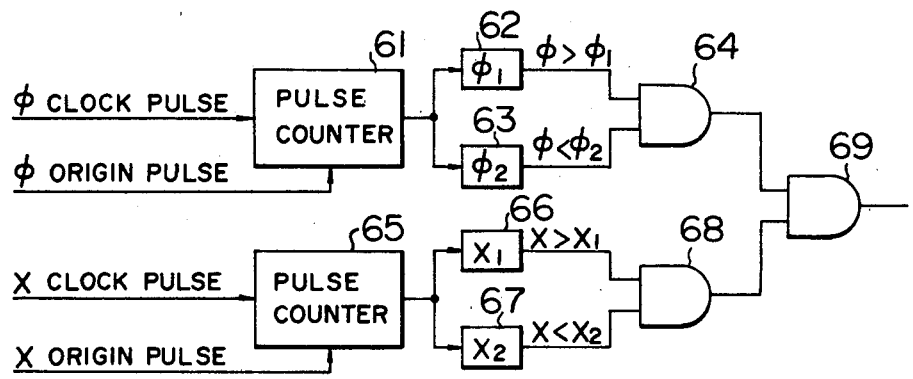
FIG. 5 shows one embodiment of a picture selector of FIG. 2.

The picture selector 6 sends a signal for reading the highlight point density value of the original picture to be processed from the memory 7, and comprises pulse counters 61 and 65, comparators 62, 63, 66 and 67, and AND gate 64, 68 and 69, as shown in FIG. 5. Such a picture selector 6 shown in FIG. 5 is constructed for one original picture, and thus a number of these selectors corresponding to the number of original pictures mounted on the picture cylinder are required.

To the pulse counter 61, $\phi$ clock pulses and $\phi$ origin pulses are fed, a plurality of $\phi$ clock pulses being generated by a rotary encoder (not shown) disposed coaxially to the picture cylinder, for each rotation and one $\phi$ origin pulse being generated by the same for each one rotation. To the pulse counter 65, X clock pulses and X origin pulses are fed, a plurality of X clock pulses being generated by a linear encoder (not shown) disposed in parallel with the picture cylinder's axis, for the one way travel and one X origin pulse being generated when a scanning head is returned to an origin thereof.

Figure 6:
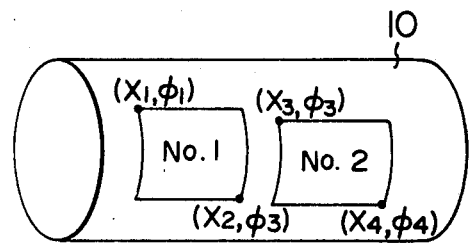
FIG. 6 shows original pictures mounted to a picture cylinder of a picture reproducing machine.

In the comparators 62 and 63, for example, the clock pulse numbers corresponding to the distances from the $\phi$ origin to the start and the end positions or the left upper and the right lower coordinates $\phi_1$ and $\phi_2$ of the original picture No. 1 mounted to the picture cylinder 10, as shown in FIG. 6, are set, and in the comparators 66 and 67, the clock pulse numbers corresponding to the distances from the X origin to the left upper and the right lower coordinates $X_1$ and $X_2$ of the original picture No. 1, are set.

Further, the comparators 62 and 66 output high level signals to the AND gates 64 and 68 when the clock pulse numbers counted by the counters 61 and 65 are larger than those set in the comparators 62 and 66, and the comparators 63 and 67 output high level signals to the AND gates 64 and 68 when the clock pulse numbers counted by the counters 61 and 65 are lower than those set in the comparators 63 and 67. The output signals of the AND gates 64 and 68 are fed to the AND gate 69. Therefore, while the original picture No. 1 is scanned, the AND gate 69 outputs a discrimination signal for the original picture No. 1.

Then, by using the discrimination signal output from the AND gate 69 as an addressing signal for reading the data out of the memory 7, the highlight and the shadow point density values or, as occasion demands, the predetermined values corresponding to the density range for the original picture selected are read from the memory 7.

The output voltage value signal Ed output from the highlight point density setter 4 is then sent to the shadow point density setter 5, as shown in FIG. 2. Now, assuming that the signal Ed has the value Edr when D equals $D_1$ in the equation VI, the equation VI is expressed in the following equation VII.

$$Edr = \alpha \log Edr + \beta \tag{VII}$$

When the equation VII is substituted into the equation VI, the signal Ed is expressed as follows.

$$Ed = -\alpha(R \cdot D - D_1) + Edr \tag{VIII}$$

Figure 7:
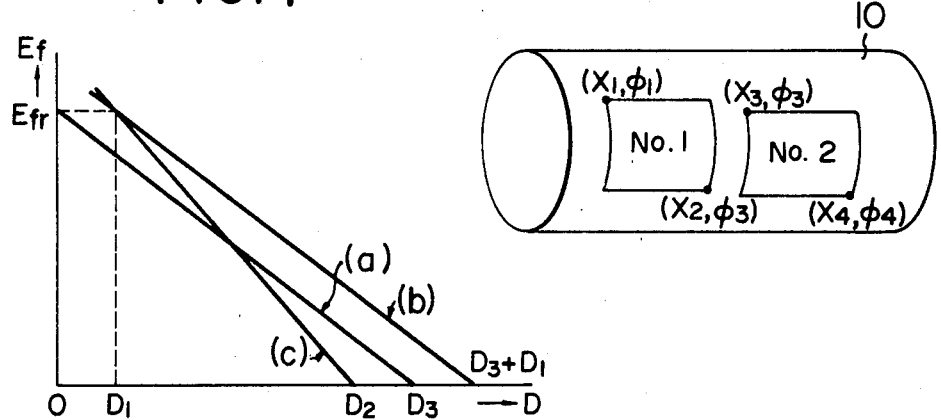
FIG. 7 is a graph showing a shadow setup condition according to the present invention.

On the other hand, as shown in FIG. 7, when the shadow point density value is $D_2$, the setup of the shadow point density value equals the transformation of a characteristics line (b) which is obtained from a characteristics line (a) by setting up the highlight point density value $D_1$, into a characteristics line (c).

However, in this case, in order to simplify the explanation, the minimum density value of the reproducible density range of the picture reproducing machine is determined to be nought. In FIG. 7 Ef is the voltage output from the shadow point density setter 5, and Efr is the voltage corresponding to the standard highlight point density value. Thus, the line (c) of FIG. 7 is represented in the following equation IX.

$$Ef = \frac{-Efr}{D_2 - D_1}(R \cdot D - D_1) + Efr \tag{IX}$$

From the equations VIII and IX the following equation X is obtained.

$$Ef = \frac{-Efr}{D_2 - D_1} \cdot \frac{Edr - Ed}{\alpha} + Efr \qquad (X)$$

Therefore, the shadow point density setter 5 is so constructed as to perform the calculation according to the equation X.

Figure 8:
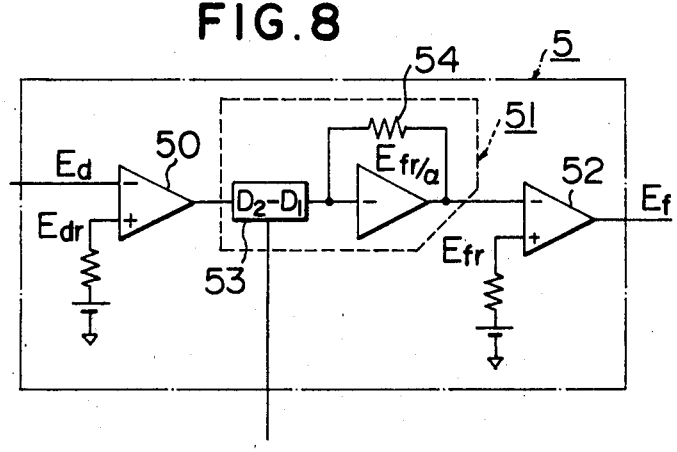
FIG. 8 shows one embodiment of a shadow point density setter of FIG. 2.

In FIG. 8 there is shown one embodiment of the shadow point density setter 5 comprising differential amplifiers 50 and 52 and an operational amplifier 51.

The signal Ed is fed to the negative terminal of the differential amplifier 50 and the voltage Edr is input to the positive terminal of the same. In the differential amplifier 50 the difference Edr-Ed is calculated and is sent to the operational amplifier 51 in which the difference Edr-Ed is divided by a value $D_2-D_1$ which is set in a resistor network 53 and corresponds to the density range of the original picture, and then is multiplied by a value (Efr/α of a resistor 54, thereby outputting the value $$\frac{Efr}{D_2 - D_1} \cdot \frac{Edr - Ed}{\alpha}$$

from the operational amplifier 51.

This output value $$\frac{Efr}{D_2 - D_1} \cdot \frac{Edr - Ed}{\alpha}$$

is fed to the negative terminal of the differential amplifier 52 and the voltage Efr is input to the positive terminal of the differential amplifier 52. The differential amplifier 52 calculates the difference between these two values and outputs a signal Ef having the following output value.

$$Ef = \frac{-Efr}{D_2 - D_1} \cdot \frac{Edr - Ed}{\alpha} + Efr$$

Figure 9:
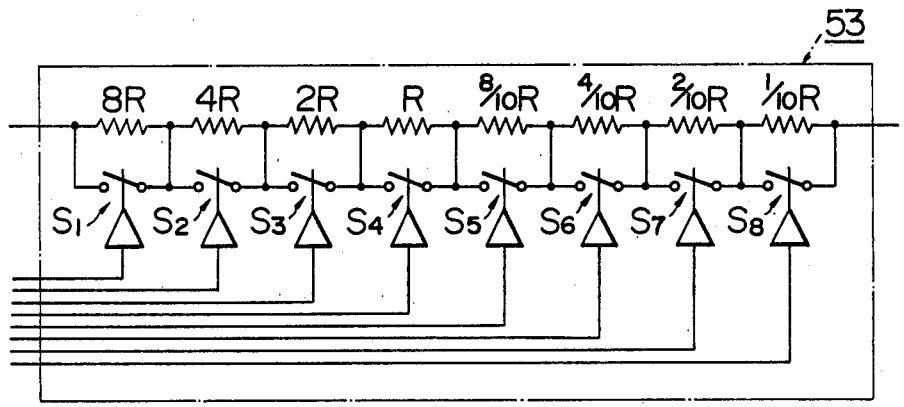
FIG. 9 shows one embodiment of a resistor network of FIG. 8.

In FIG. 9 is shown one embodiment of the resistor network 53 of FIG. 8, comprising a combination of a series of resistors 8R, 4R, 2R, R, 8/10R, 4/10R, 2/10R and 1/10R and analog switches $S_1$-$S_8$. In the resistor network 53 the value $D_2-D_1$ can be set up by closing and/or opening the analog switches $S_1$-$S_8$ by using a signal which is obtained by converting an 8-bits digital signal which corresponds to the density range of the original picture and is read out of the memory 7, in a D/A converter. In FIG. 8, Edr and Efr are the standard voltages predetermined.

In the embodiment described above, although the values corresponding to the density range of the original picture to be processed are read from the memory 7 and then are set up in the shadow point density setter 5, however, the highlight and the shadow point density values read out of the memory 7 may be sent to the shadow point density setter 5, and then the values corresponding to the density range of the original picture may be obtained there.

Figure 10:
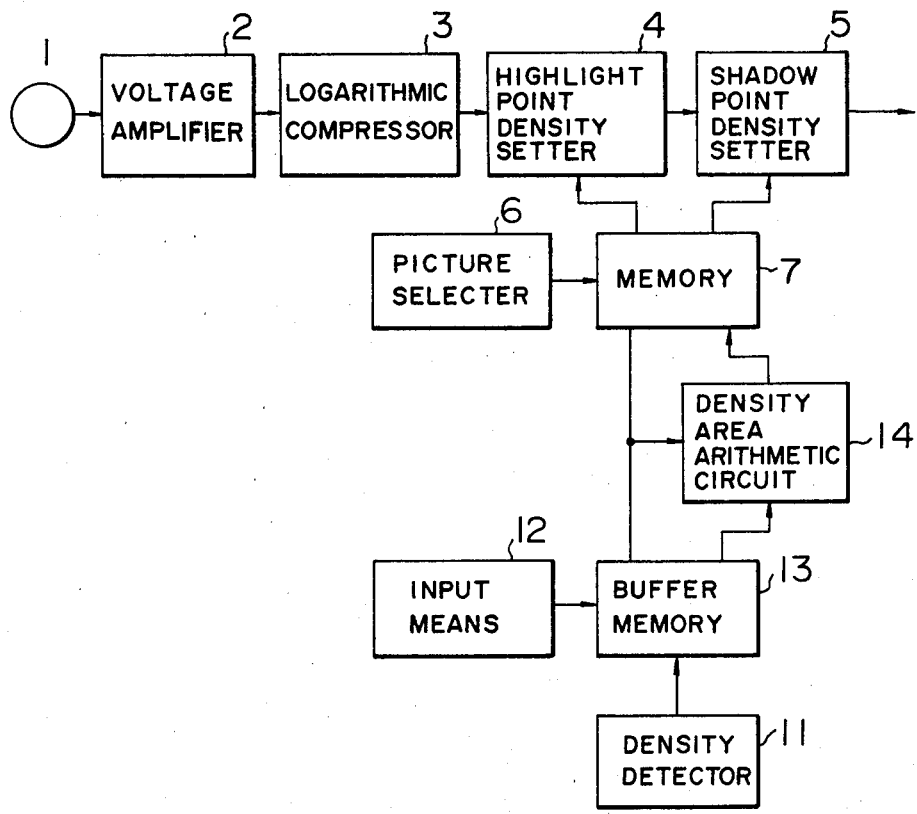
FIG. 10 is a block diagram of another embodiment of means for performing a method according to the present invention.

In FIG. 10 there is shown another embodiment of means for performing a method according to the present invention.

In this embodiment, when the highlight and the shadow point density values or the values corresponding to the density ranges of the original pictures are written in the memory 7, the highlight and the shadow point density values of the original pictures are consecutively detected by a densitometer 11 which outputs digital signals, and the positions and the distances detected of the corresponding original pictures are once written in a buffer memory 13 by using an input means 12 such as a key board, or the like. Then, the highlight point density values read out of the buffer memory 13 are stored in the corresponding addresses of the memory 7, and, at the same time, the highlight and the shadow point density values read out of the buffer memory 13 are sent to a density area arithmetic circuit 14 in which the values corresponding to the density ranges of the original pictures are obtained and then the values obtained are sent to the memory and are stored in the corresponding addresses thereof.

In this case, unlike a conventional method wherein the point density values detected by the densitometer are set up manually in the picture reproducing machine by an operator, the point density values detected are directly written in the memory and then the values are read out the memory are sent and set up in the picture reproducing machine. Accordingly, the present method can remove the mistakes made by the operator.

Although the present invention has been described with reference to preferred embodiments thereof, however, various changes and modifications can be made by those skilled in the art departing from the scope of the present invention.

What is claimed is:

1. A method for setting density values of highlight and shadow points of original pictures in a picture reproducing machine, comprising the steps of:
   (a) scanning an original picture while producing a discrimination signal responsive to the scanning of said original picture;
   (b) reading highlight and shadow point density values or values corresponding to a density range of said original picture from a memory in which the highlight and the shadow point density values or the values corresponding to the density ranges of original pictures are stored, by addressing the memory by means of said discrimination signal; and
   (c) setting the values read from the memory in the picture reproducing machine.

2. A method as defined in claim 1, comprising detecting the highlight and the shadow point density values or the values corresponding to the density ranges of the original picture with a densitometer and applying the output values from the densitometer to a memory coupled thereto.

3. A method as defined in claim 1 or 2, further comprising storing the highlight and the shadow point density values or the values corresponding to the density ranges of the original picture in a buffer memory.

* * * * *

UNITED STATES PATENT AND TRADEMARK OFFICE
CERTIFICATE OF CORRECTION

PATENT NO. : 4,371,260
DATED : February 1, 1983
INVENTOR(S) : Takeshi Yoshimoto et al.

It is certified that error appears in the above—identified patent and that said Letters Patent is hereby corrected as shown below:

Col. 1, line 24, change "have" to --has--.

Col. 2, line 6, change "valuesread" to --values read--.

Col. 3, line 51, change " $\beta D_1$ " to -- $\alpha D_1$ --.

Col. 3, line 68, delete "one".

Col. 5, line 22, delete the parenthesis.

Signed and Sealed this

First Day of January 1985

[SEAL]

Attest:

GERALD J. MOSSINGHOFF

Attesting Officer     Commissioner of Patents and Trademarks